3,316,080
METHOD FOR INHIBITING GROWTH OF WEEDS AND GRASSES

Takayuki Inoue, Kichiro Kato, Teruhiko Toyama, and Mitsunori Takagi, Ohmuta-shi, Fukuoka-ken, Japan, assignors to Mitsui Kagaku Kogyo Kabushiki Kaisha, Chuo-ku, Tokyo, Japan, a corporation of Japan
No Drawing. Filed May 19, 1964, Ser. No. 368,733
Claims priority, application Japan, May 23, 1963, 38/25,610
1 Claim. (Cl. 71—2.3)

This invention relates to herbicides which are characterized in that they contain as their active ingredient a compound having the formula:

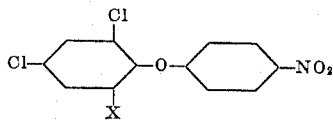

wherein X is a member selected from the group consisting of chlorine and methyl, i.e., 2,4,6-trichlorophenyl-4'-nitrophenylether or 2-methyl-4,6-dichlorophenyl-4'-nitrophenylether; and to a method by which weeds and grasses infesting useful plants are controlled.

The object of the present invention resides in providing at low cost a chemical effective in destroying weeds, particularly wild barnyard grass and other rice-field weeds, but which is very harmless to fishes.

2,4-dichlorophenoxyacetic acid (hereinafter referred to as 2,4-D) and 2-methyl-4-chlorophenoxyacetic acid (hereinafter referred to as MCP) as used extensively as herbicides. However, in the preparation of these compounds isomers and homologues are simultaneously formed, and of these the compounds, those in which the hydrogen atoms at the 2 and 6 positions of phenol have both been substituted by either chlorine atoms or a chlorine atom and a methyl group, for example, 2,6-dichlorophenoxyacetic acid, 2,4,6-trichlorophenoxyacetic acid, 2-methyl-6-chlorophenoxyacetic acid and 2-methyl-4,6-dichlorophenoxyacetic acid, are inert to weeds and hence worthless as herbicides. Hence, it is necessary to prepare high grade 2,4-D or MCP in which the contents of these inert components are small for profitably manufacturing these herbicides. However, in the most widely practiced process for preparing 2,4-D or MCP, i.e., the process in which phenol or 2-methylphenol is reacted with chlorine gas to obtain dichlorophenol or monochloro-2-methylphenol, which is then condensed with monochloroacetic acid, there are present in the resulting dichlorophenol or monochloro-2-methylphenol 10–30% of unnecessary chlorophenols such as, for example, ortho-chlorophenol, para-chlorophenol, 2,6-dichlorophenol, 2,4,6-trichlorophenol, 2-methyl-6-chlorophenol and 2-methyl-4,6-dichlorophenol besides the 2,4-dichlorophenol or 2-methyl-4-chlorophenol necessary as the starting material for 2,4-D or MCP, even though the phenol or 2-methylphenol is reacted with the chlorine gas under fully controlled conditions. Hence, in preparing high grade 2,4-D or MCP using these as the starting materials it is required that the unnecessary chlorophenols present should be separated and eliminated by distillation or other operations.

When, as an effective method of utilizing the aforesaid unnecessary chlorophenols which are separated in preparing 2,4-D or MCP, we synthesized nitrophenyl ether derivatives of these chlorophenols and conducted a series of tests to determine their herbicidal effectiveness, we found the fact, as can be seen from Test 1, below, that the compounds having the formula

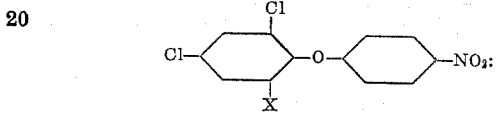

wherein X is a member selected from the group consisting of chlorine and methyl, i.e., the two compounds of 2,4,6-trichlorophenyl-4'-nitrophenylether and 2-methyl-4,6-dichlorophenyl-4' - nitrophenylether, exhibit remarkable herbicidal action and thus were utilizable as herbicides. This fact was contrary to the expectation that the herbicidal effectiveness would disappear completely, as seen in the case of the phenoxy herbicides, when the hydrogen atoms at the 2 and 6 positions of chlorophenol were both substituted by either chlorine atoms or a chlorine atom and a methyl group.

Test 1

The potassium salts (or a mixture of potassium and sodium salts) of various chlorophenols and para-nitrochlorobenzene were reacted for 10 hours at 200° C., then after separating and purifying the chlorophenylnitrophenylethers from the reaction products, a surfactant and clay were blended to prepare their wettable powders.

Filter papers were laid in Petri dishes 9 cm. in diameter, to which were then added 3 ml. of the composition consisting of the wettable powder diluted with water to the various concentrations indicated in Table I. 25 grains of barnyard grass seeds were then sown in the dishes where they were soaked with the composition, following which the dishes were held at 28° C. for two weeks. At the end of this period, the number of barnyard grass growing was investigated. The average rates of growth obtained by repeating the test twice were as follows:

TABLE I

| Compound Tested | | Growth Rate at the Various Concentrations (Concentration of Active Ingredient), Percent | | | |
|---|---|---|---|---|---|
| Structure Formula | Melting Point, °C. | 0.1% | 0.03% | 0.01% | 0.003% |
| 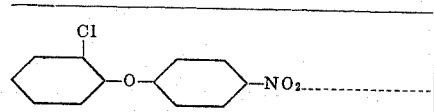 | 74–76 | 64 | 92 | 84 | 92 |
| 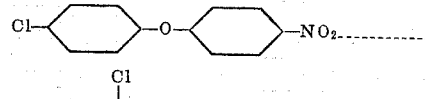 | 67–69 | 80 | 72 | 64 | 88 |
| 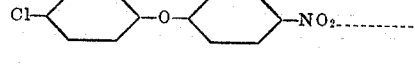 | 69–71 | 0 | 0 | 0 | 0 |

TABLE I—Continued

| Compound Tested | | Growth Rate at the Various Concentrations (Concentration of Active Ingredient), Percent | | | |
|---|---|---|---|---|---|
| Structure Formula | Melting Point, °C. | 0.1% | 0.03% | 0.01% | 0.003% |
| 2,6-dichlorophenyl-4'-nitrophenylether | 115–117 | 88 | 96 | 92 | 96 |
| 2,4,6-trichlorophenyl-4'-nitrophenylether (Invention compound) | 99–101 | 0 | 0 | 0 | 0 |
| 2-methyl-4-chlorophenyl-4'-nitrophenylether | 65–66 | 88 | 96 | 84 | 96 |
| 2-methyl-6-chlorophenyl-4'-nitrophenylether | Liquid | 40 | 52 | 60 | 80 |
| 2-methyl-4,6-dichlorophenyl-4'-nitrophenylether (Invention compound) | 85–87 | 0 | 0 | 0 | 0 |
| Control (water) | | 96 | 94 | 84 | 84 |

For confirming the practical usefulness as herbicides of 2,4,6-trichlorophenyl-4'-nitrophenylether and 2-methyl-4,6-dichlorophenyl-4'-nitrophenylether which were shown to possess herbicidal actions, herbicidal effectiveness tests were conducted on paddy fields as well as ordinary fields. The results, as apparent from Test 2, indicated that they had pronounced weed control effects which equaled, if not exceeded, that of 2,4-dichlorophenyl-4'-nitrophenylether which is known as Herbicide FW-925. In addition, it was found that they were practically harmless to grown vegetation and thus it was confirmed that they could be actually used as herbicides.

These two compounds are not reported in chemical literature published to date. Hence, since it goes without saying that it was not known that these compounds had such remarkable herbicidal action with respect to weeds, the use of these compounds as herbicides is an entirely novel invention.

Test 2

The potassium salt of 2,4,6-trichlorophenol and para-nitrochlorobenzene were reacted for 10 hours at 200° C., then the unreacted reactants were removed by steam distillation and washing with an aqueous alkaline solution, followed by recrystallization twice from n-propyl alcohol to obtain light brown crystals (I) having a melting point of 108.5–109° C. Results of elementary analysis revealed that these crystals contained 33.38% of Cl and 4.34% of N (the theoretical content, calculated as $C_{12}H_6Cl_3NO_3$, of Cl is 33.44% and N is 4.40%). On the other hand, according to the results of an infrared analysis, the presence of the —O— group and the —NO$_2$ group was observed. Thus, it was confirmed that the crystals were 2,4,6-trichlorophenyl-4'-nitrophenylether.

Further, the potassium salt of 2-methyl-4,6-dichlorophenol and para-nitrochlorobenzene were reacted and purified following the same procedures as described above

TABLE II

| | Amount Applied, gram/are | New Compound According to the Present Invention | | | | Herbicide FW-925 | |
|---|---|---|---|---|---|---|---|
| | | 2,4,6-trichlorophenyl-4'-nitrophenylether | | 2-methyl-4,6-dichlorophenyl-4'-nitrophenylether | | 2,4-dichlorophenyl-4'-nitrophenylether | |
| | | Weed Growth, percent (compared with untreated soil) | Harm Caused by Chemical | Weed Growth, percent (compared with untreated soil) | Harm Caused by Chemical | Weed Growth, percent (compared with untreated soil) | Harm Caused by Chemical |
| Paddy Field | 50 | 0 | Practically no | 0 | No | 0 | Slight. |
| | 25 | 0 | No | 2 | No | 1 | No. |
| | 10 | 2 | No | 13 | No | 11 | No. |
| | 5 | 28 | No | 61 | No | 46 | No. |
| Ordinary Field | 100 | 0 | No | 0 | No | 0 | No. |
| | 50 | 0 | No | 3 | No | 4 | No. |
| | 25 | 6 | No | 22 | No | 16 | No. |
| | 10 | 29 | No | 79 | No | 58 | No. | to obtain light yellowish brown crystals having a melting point of 92.5–93.5° C. Results of elementary analysis indicated that the chlorine content of these crystals was 23.77% and that of N was 4.69% (the theoretical content, calculated as $C_{13}H_9Cl_2NO_3$, of Cl is 28.83% and that of N is 4.70%). On the other hand, according to the results of an infrared analysis, the presence of the —O— group and the —NO$_2$ group was observed, thus confirming that these crystals were 2-methyl-4,6-dichlorophenyl-4'-nitrophenylether.

Ten parts by weight of the crystals (I) and (II) and the crystals of 2,4-dichlorophenyl-4-nitrophenylether, the effective ingredient of Herbicide FW–925, were each blended with 3 parts by weight of the calcium liginsulfonate and 87 parts by weight of bentonite, the respective wettable powders then being prepared by grinding and mixing the constituents.

A ½₀₀₀-are Wagner pots were filled with paddy field soil to a depth of 30 cm. and into their upper layer were mixed about 200 grains of wild barnyard grass seeds. Three stocks of paddy rice seedings were then transplanted to the pots and the depth of the water therein was maintained at a level of 3 cm. Five days later the wettable powders were applied uniformly without dilution. Three weeks after treatment, the amount of weed growth and the harm caused by the chemicals on the rice plants were investigated. Further, boxes 20 cm. x 25 cm. were filled with ordinary field soil and after seeding with wheat were covered with 3 cm. of soil. Then 10 cc. of the compositions consisting of the wettable powders diluted with water were applied. One month later, the amount of weed growth and the harm caused by the chemicals on the plants were investigated. The results obtained are shown in Table II.

Thus, it was confirmed that the novel compounds of the present invention, 2,4,6-trichlorophenyl-4'-nitrophenylether and 2-methyl-4,6-dichlorophenyl-4'-nitrophenylether, could control the growth of weeds without causing harm to plants by applications in an amount of 10–50 grams per are in the case of paddy fields and 25–100 grams per are in the case of ordinary fields.

Generally speaking, the herbicides which are harmful to fish, such as the PCP herbicides, cannot be regarded as being desirable herbicides, even though their herbicidal effectiveness is great. The present day demand in the art is for a herbicide which is safe and not toxic to fish. Therefore, in order to find the toxicity of the invention compounds to fish, a toxicity test was conducted with scarlet crucian carp. Ten scarlet crucian carp were placed in 10 liters of a composition consisting of the wettable powder of compounds (I) and (II) used in Test 2, above, diluted with water. The results of investigations 5 days later to determine the number of those living and dead revealed that in both instances more than one half died when the concentration in terms of the compounds was 100 milligrams/liter and 1–2 died at a concentration of 50 milligrams/liter, but that all remained alive at every concentration of below 25 milligram/liter. Considering that in the case of the PCP herbicides there was 2–3 deaths even at a low concentration of the order of 0.2 milligram/liter, it can be said that the toxicity to fish of the invention compounds is less than 1/400 of that of the PCP herbicides. The problem of toxicity to fish arises chiefly when a herbicide is applied to paddy fields. In the case the compounds of this invention, however, since their use for controlling weeds suffices with an application of 10–50 grams per are, which is only a concentration of 2–10 milligrams/liter when the water level of the paddy is 5 cm., the invention compounds are completely nontoxic to fish even at concentrations effective for controlling weeds in paddy fields. In this respect also, the compounds of this invention fulfill the requirements as excellent herbicides.

Another condition that a herbicide must satisfy to enable it to be put to practical use is that it must be available at low cost. This requirement is also met by the invention compounds. The reason is because the starting materials for the invention compounds are the relatively inexpensive phenol or 2-methyl phenol. Further, in certain cases, it is also possible to utilize as the starting material the low cost by-product chlorophenols of low value obtainable during the preparation of 2,4-D or MCP. In addition, the reaction in which 2,4,6-trichlorophenol or 2-methyl-4,6-dichlorophenol is prepared by chlorination of the foregoing starting materials and the reaction for preparing the invention compounds by reacting these 2,4,6-trichlorophenol or 2-methyl-4,6-dichlorophenol with para-nitrochlorobenzene can both be carried out in good yield, thus making possible the low-cost preparation of the invention compounds. Consequently, the present invention provides excellent herbicides from the economical standpoint and at the same time contributes to the cost reduction and rationalization of the preparation of 2,4-D or MCP.

As previously indicated, since the compounds of the present invention fulfill completely the requirements necessary as an excellent herbicide, such as their remarkable weed controlling effects, their safety with respect to plant life and fish and their low cost, it is believed that they can bring about great profits to farming operations.

In using the invention compounds as herbicides, it is necessary to use them in a form such as will make them compatible with water, such as an emulsion, a wettable powder or a granular preparation, since these compounds are difficultly dissolved in water. In view of their actions toward weeds, it is preferable that their application is made prior to the germination or during the early stages of the germination of the weeds, the application being suitably made in an amount of 5–100 grams, and normally 10–50 grams, per are, in terms of the active ingredient.

The two compounds of the present invention may not only be used alone or in combination but may also be mixed and used with the other agricultural chemicals such as herbicides, insecticides and germicides, or may even be mixed and used with fertilizers, such as urea.

For a better understanding of the invention, the following examples are given, it being understood that these are merely in illustration and not in limitation of the invention.

EXAMPLE 1

The reaction was carried out by introducing into 1 mole of phenol 0.95 mole of chlorine gas for 2.5 hours at 40–45° C., after which vacuum distillation was effected at 20 mm. Hg and the fraction below 100° C. was collected. The reaction was further carried out at 60–70° C., by introducing chlorine gas into this fraction until no further evolution of hydrochloric acid gas took place to obtain 2,4,6-trichlorophenol with a purity of 97.8%. When 1 mole of the residue of the foregoing distillation containing predominantly para-chlorophenol was reacted once more 1.5 hours at 50–55° C., by introducing in 0.95 mole of chlorine gas, 2,4-dichlorophenol having a purity of 95.9% was obtained. This could be used as the starting material for preparing high-grade 2,4-D.

198 grams (1 mole) of 2,4,6-trichlorophenol and 116 grams of an aqueous 48.5% potassium hydroxide solution (1 mole as KOH) were reacted while effecting dehydration. After completion of the reaction, 158 grams (1 mole) of para-nitrochlorobenzene and 300 grams of nitrobenzene as the solvent were added and the reaction was continued for 20 hours at 200° C. The reaction product was then steam distilled to expel the nitrobenzene and the unreacted para-nitrochlorobenzene, following which the residue was washed with alkaline water and then with water followed by drying to obtain 249 grams of a brown solid having a melting point of 99–101° C., at a yield of 78.1%. An infrared analysis of this solid indicated that it was 2,4,6-trichlorophenyl-4'-nitrophenylether having a purity of 93.2%.

To 22 parts by weight of the foregoing 2,4,6-trichlorophenyl-4'-nitrophenylether were blended 3 parts by weight of calcium ligninsulfonate, 45 parts by weight of bentonite and 30 parts by weight of clay, then by grinding and mixing these components thoroughly a wettable powder containing 20% by weight of the active ingredient was prepared. Fifteen liters of a composition consisting of this wettable powder diluted in water to 100 times were applied uniformly to a 1-are paddy field; i.e., an application equivalent to 30 grams of 2,4,6-trichlorophenyl-4'-nitrophenylether per are. The results were that no growth of weeds could be observed even after a month had elapsed.

EXAMPLE 2

The reaction was carried out by introducing chlorine gas into phenol at 60–70° C., for about 8 hours, i.e., until no further evolution of hydrochloric acid gas was observed, to obtain 2,4,6-trichlorophenol in a purity of 98.4%. To 396 grams (2 moles) of this 2,4,6-trichlorophenol were gradually added 58 grams of an aqueous 48.5% potassium hydroxide solution (0.5 mole as KOH) and 142 grams of an aqueous 45% sodium hydroxide solution (1.6 mole as NaOH), and the reaction was carried out while effecting dehydration. Then, after charging 346 grams (2.2 moles) of para-nitrochlorobenzene, the reaction was carried out for 20 hours at 200° C. The reaction product was then separated and recrystallized from a fourfold amount of n-propyl alcohol to obtain 478 grams of brown crystals having a melting point of 102–104° C., at a yield of 75.1%. An infrared analysis of this product showed that it was 2,4,6-trichlorophenyl-4'-nitrophenylether having a purity of 96.4%.

To 5.5 parts by weight of this 2,4,6-trichlorophenyl-4'-nitrophenylether were added 1.5 parts by weight of sodium alkylbenzenesulfonate, 83 parts by weight of bentonite and 10 parts by weight of talc, which components were ground and mixed. Then, after adding 20 parts by weight of water, the mixture was kneaded together and rolled with rolls, followed by grinding, drying and screening, whereby was prepared a granular preparation of 0.2–1.0 mm. particle size containing 5% by weight of the active ingredient. Using a grain scatterer, this granular preparation was applied to a paddy field at the rate of 300 grams per are 7 days after transplanting of rice seedlings. That is to say, this amounts to the application of 15 grams per are of the effective ingredient 2,4,6-trichlorophenyl-4'-nitrophenylether. As a result, the amount of weed growth was less than 10% of that of a paddy field where no weed control treatment was given and no growth impediment in the rice plants was observed in the least. Further, although crucian carp were placed in the paddy field 3 hours after the granular preparation was scattered, they did not die even after 3 days elapsed. Even though 2 months later, no more weed growth was observed.

EXAMPLE 3

The reaction was carried out by introducing into 1 mole of 2-methylphenol 0.9 mole of chlorine gas at 70–80° C., following which the fraction below 100° C. was collected by vacuum distillation at 20 mm. Hg. 1 mole of this fraction was then reacted by introducing 1.2 moles of chlorine gas at 100–120° C., to obtain 2-methyl-4,6-dichlorophenol having a purity of 93.8% (the distillation residue was 2-methyl-4-chlorophenol having a purity of 97.3%, which could be used as the starting material for preparing high-grade MCP).

174 grams (1 mole) of 2-methyl-4,6-dichlorophenol and 116 grams of an aqueous 48.5% potassium hydroxide solution (1 mole as KOH) were reacted while effecting dehydration, following which 158 grams (1 mole) of para-nitrochlorobenzene and 300 grams of nitrobenzene as the solvent were charged to the system and the reaction was continued for 10 hours at 160° C. The reaction product was then steam distilled to expel the nitrobenzene and the unreacted para-nitrochlorobenzene. By washing the residue with an aqueous alkaline solution and then with water followed by drying, 229 grams of a dark brown solid were obtained at a yield of 76.8%. As a result of an infrared analysis, this was 2-methyl-4,6-dichlorophenyl - 4' - nitrophenylether having a purity of 92.9%.

27 parts by weight of this 2-methyl-4,6-dichlorophenyl-4'-nitrophenylether were dissolved in 68 parts by weight of solvent naphtha and by adding and mixing therewith 5 parts by weight of polyoxyethylene alkylphenyl ether an emulsion containing 25% by weight of the active ingredient was prepared.

A field sown with soybeans and covered with 3 cm. of soil was sprayed with 20 liters per are of the foregoing emulsion diluted in water to 100 times, i.e., the active ingredient 2-methyl - 4,6-dichlorophenyl-4'- nitrophenylether was applied at the rate of 50 grams per are. As a result, the herbicidal effects were very marked, the growth of weeds being very sparse.

What we claim is:

A method for inhibiting growth of weeds and grasses which comprises applying to the locus to be protected from weeds and grasses in an amount sufficient to exert herbicidal action thereon and at a rate from about 5 to about 100 grams of 2,4,6-trichlorophenyl-4'-nitrophenylether, said application being made during the period up until the early stages of the germination of the weeds and grasses.

References Cited by the Examiner

UNITED STATES PATENTS 3,080,225   3/1963   Wilson et al.   _____ 71—2.3
3,154,398  10/1964   McRae   _____ 71—2.6

OTHER REFERENCES

Dahlgard—J. Am. Chem. Society, vol. 80, pp. 5861–63 (1958).

LEWIS GOTTS, *Primary Examiner.*

JAMES O. THOMAS, JR., *Examiner.*

A. J. ADAMCIK, *Assistant Examiner.*